Patented Sept. 11, 1923.

1,467,858

UNITED STATES PATENT OFFICE.

EUGEN KNUDSEN, OF TRONDHJEM, NORWAY.

PROCESS FOR TANNING FISH SKINS.

No Drawing.   Application filed March 19, 1921.   Serial No. 453,741.

*To all whom it may concern:*

Be it known that I, EUGEN KNUDSEN, a subject of the King of Norway, residing at Trondhjem, Norway, have invented a new and useful Improved Process for Tanning Fish Skins, of which the following is a specification.

Investigations and tests made for a long time with reference to the special qualities of fish skins in relation to other skins, have shown that fish skins are far more sensitive to the reagents employed during tanning so that even moderately strong liming will destroy the skins and moderately strong tanning processes are still more deleterious.

A special characteristic of fish skins is their small power of resisting acid containing dressings, and they must therefore be submitted to treatment to render them capable of withstanding the various essential and desirable processes.

According to my invention, the fish skins after being thoroughly salted, as a part of the tanning process and not merely in order to preserve the skins until the tanning process can be commenced, are limed in a weak solution of milk of lime to which a small quantity of soda may be added, and the strength of the solution of milk of lime is increased gradually by the addition of lime gruel from time to time. The skins are thus brought to a condition in which, immediately after being rinsed, they are fit to undergo treatment with a puering liquor, or the puering may be omitted and the skins forthwith submitted to the action of a tanning reagent.

In the case chrome tannage, the preliminary salt bath is acidulated by pouring in dilute acid at intervals in increasing quantities; and after treatment with the crome solution, the skins undergo a reducing process with sodium thiosulphate or soda.

As the result of practical tests and investigations I have found that a tanned material of a handsome, useful and luxurious type, of prime quality and high commercial value can be produced from skins of cat fish, skate, and like fish as follows:
The skins are first of all completely and uniformly treated with salt; the use of weak or impure salt should be avoided. The skins should then be treated for liming with a weak aqueous solution of milk of lime to which a small quantity of soda may be added. Fresh solution is added in small quantities at regular and frequent intervals as the lime acts upon the skins, to progressively increase the strength of the solution.

Instead of the usual puering process it is advantageous to rinse the skins in water only, or to treat them for only a very short time with a puering agent such as is used for the finer sorts of leathers, in a very diluted state.

The skins are then treated with a vegetable or chemical tanning solution which contains only a very small proportion of acid, if any. It is safest to employ a neutralizer, for example, soda. The skins are worked until on the flesh side they have acquired the colour of the tanning agent after which the tanning is continued as prescribed for liming.

By way of example the salted fish skins may be tanned in accordance with my invention, using a chemical tanning agent, as follows:

For the liming process 1 hectolitre of water is required for each 20 kilograms of skins. Before the skins are immersed, a small quantity of soda is dissolved in the water in order to reduce or remove hardness when the water employed is not soft. To each hectolitre of this water there is added, to commence with, about 100 grammes of stiff lime gruel prepared by stirring together lime and water in the proper proportions to produce a stiff paste. The milk of lime solution thus obtained is refreshed about every twelve hours, the first time with about 200 to 250 grammes of stiff lime gruel per hectolitre of water, this quantity being increased by 100 to 150 grammes hectolitre. This quantity is increased by 100 to 150 grammes each time the lime water is refreshed and the process is continued for 4 to 6 days depending on the size or thickness of the skins and on the nature of the salting process to which they have been submitted. A thorough rinsing in soft water then follows.

The puering process is carried out by treating the skins in a week solution of chicken manure for about 6 hours.

For chrome tannage the skins are next subjected to a treatment in a solution of sodium chloride to which hydrochloric acid is added. For each kilogram of skins there is provided 2 litres of water having 20 110 grammes of sodium chloride dissolved therein and 1 litre of water to which 2 grammes of concentrated hydrochloric acid are added. The skins are placed first in the sodium chloride solution and after an interval of 5 minutes one-tenth of the hydrochloric acid solution is added. After a further interval of 5 minutes three tenths of the acid solution is poured in and again after another interval of 5 minutes the remaining six tenths of the acid solution is poured in also. This treatment with an acidulated salt solution will be completed in about 20 minutes during which time a constant and thorough stirring is maintained. The skins are then soaked in soft water at a temperature of about 20° C.

This treatment with an accidulated salt solution is followed by treatment with a solution of chromate of potassium. For each kilogram of skins 40 to 45 grammes of pure chromate are used dissolved in 2½ litres of water with the addition of 8 grammes of concentrated hydrochloric acid. The skins are first treated with one tenth of the chrome solution in six times the quantity of water. At the end of ¾ of an hour two tenths of the chrome solution in an equal quantity of water is added. Then at the end of a further ½ hour three tenths of the chrome solution in one third the quantity of water and finally after yet another ½ hour the remaining four tenths of chrome solution in one fourth the quantity of water is added. In about 1½ hours after the last addition of the chrome solution this process is complete.

During all this time the temperature should be kept at about 20° C. The skins are next washed in soft water and left for 3 to 4 hours protected from the action of light.

The reducing process is carried out with sodium thiosulphate or soda. For example, the following quantities are used per kilogram of skins, 125 to 140 grammes of thiosulphate dissolved in 2½ litres of warm water and 10 grammes of hydrochloric acid dissolved in ½ litre of water. The skins undergo the reducing process in the thiosulphate solution at a temperature of 22° to 25° C., and the acid is added in eight or ten separate portions at intervals of a quarter of an hour.

The skins are then freed from acid by means of tepid water and chalk and thoroughly rinsed after which they are prepared for use in the usual manner.

I claim:—

1. A process for tanning fish skins, wherein the skins are limed in a solution of milk of lime commencing with about one hundred grammes of stiff lime gruel in one hectolitre of water per twenty kilogrammes of skins, the solution being refreshed about every twelve hours for a period of about five days by the addition of lime gruel in quantities increased by about one hundred grammes at each addition, treated with an acidulated solution of common salt, and acted upon by an acid chromate of potassium tanning solution and by a reducing reagent.

2. A process for tanning fish skins wherein after liming, the skins are placed in a salt solution of twenty grammes of sodium chloride in two litres of water per kilogramme of skins, to which after an interval of five minutes one-tenth of an acid solution of two grammes of hydrochloric acid in one litre of water per kilogramme of skins is added, followed after a further interval of five minutes by the addition of three-tenths of the acid solution and after another interval of five minutes by the addition of the remaining six-tenths of the acid solution, and the skins are removed from the acidulated salt solution after a total period of twenty minutes, immersed in soft water at about 20° C. and acted upon by an acid chromate of potassium tanning solution and by a reducing reagent.

3. A process for tanning fish skins wherein, after liming, the said skins are puered, and are then placed in a salt solution of twenty grammes of sodium chloride in two litres of water per kilgramme of skins, to which after an interval of five minutes one-tenth of an acid solution of two grammes of hydrochloric acid in one litre of water per kilogramme of skins is added, followed after a further interval of five minutes by the addition of three-tenths of the acid solution, and after another interval of five minutes by the addition of the remaining six-tenths of acid solution, and the skins are removed from the acidulated salt solution after a total period of twenty minutes, immersed in soft water at about 20° C., and acted upon by an acid chromate of potassium tanning solution and by a reducing reagent.

4. A process for tanning fish skins, wherein the skins are treated with acid chromate of potassium solution of forty-five grammes of chromate in two and a half litres of water and eight grammes of hydrochoric acid for each kilogramme of skins, the skins being first placed in one tenth of the chromate solution diluted with six times this quantity of water, at the end of three quarters of an hour two tenths of the chromate solution in an equal quantity of water is added and treatment continued for half an hour, at the end of this period three-tenths of the chromate solution in one third this quantity of water is added and treatment continued for half an hour, at the end of this period the remaining four-tenths of the chromate solution in one fourth this quantity of water is added and treatment continued for and completed in a further one and a half hours, the temperature being maintained at about 20° C. throughout the whole of the treatment with the chromate solution, after which the skins are treated in a reducing solution of sodium thiosulphate.

5. A process for tanning fish skins, wherein the skins are limed, treated in a salt solution to which an acid solution is added, washed in water and treated with an acid chromate solution of forty-five grammes of chromate of potassium in two and a half litres of water and eight grammes of hydrochloric acid for each kilogramme of skins, the skins being first placed in one tenth of the chromate solution diluted with six times this quantity of water, at the end of three quarters of an hour two tenths of the chromate solution in an equal quantity of water is added and treatment continued for half an hour, at the end of this period three-tenths of the chromate solution in one third this quantity of water is added and treatment continued for half an hour, at the end of this period the remaining four-tenths of the chromate solution in one fourth this quantity of water is added and treatment continued for and completed in a further one and a half hours, the temperature being maintained at about 20° C. throughout the whole of the treatment with the chromate solution, after which the skins are treated in a reducing solution of sodium thiosulphate.

6. A process for tanning fish skins, wherein the skins are, after liming, treated in a salt solution to which an acid solution is added, washed in water and treated with an acid chromate of potassium solution of forty-five grammes of chromate in two and a half litres of water and eight grammes of hydrochloric acid for each kilogramme of skins, at a temperature of about 20° C. for about four hours, the skins being first placed in a diluted proportion of the solution to which increasing proportions of the solution made progressively less dilute are added from time to time, after which the skins are washed, left for three and a half hours protected from light, and then reduced by sodium thiosulphate one hundred and thirty grammes in two and a half litres of water for each kilogramme of skins to which ten grammes of hydrochloric acid in one half a litre of water is added in about ten separate portions at intervals of about a quarter of an hour.

EUGEN KNUDSEN.

Witnesses:
OLE RICHTER,
MARTIN HELLE.